Dec. 18, 1934.  I. E. JACOBSON  1,984,799
HANDLE AND CORE FOR FROZEN CONFECTIONS
Filed June 20, 1932
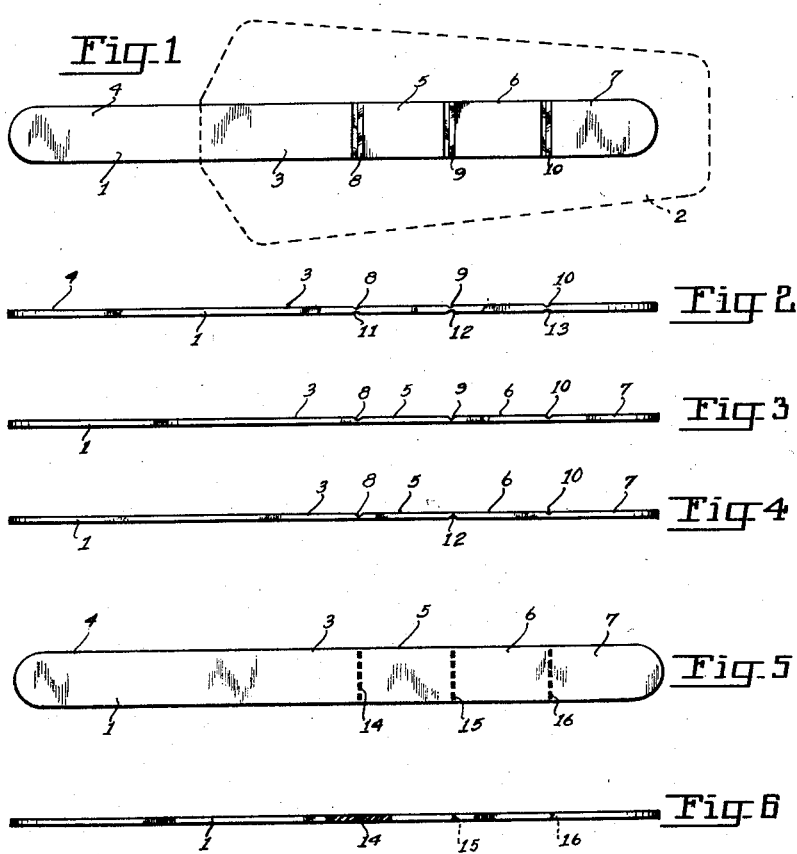
Irving E. Jacobson
Inventor
Samuel Jacobson
Attorney Patented Dec. 18, 1934

1,984,799

UNITED STATES PATENT OFFICE 1,984,799

HANDLE AND CORE FOR FROZEN CONFECTIONS

Irving E. Jacobson, Portland, Oreg.

Application June 20, 1932, Serial No. 618,271

3 Claims. (Cl. 99—16)

This invention relates to a handle and core for frozen confections in which the body-element, from which the handle and core is constructed, is divided into a plurality of removable sections or portions, although these sections or portions are, in effect, an integral part of the body-element.

There are manufactured and sold at present a number of frozen confections, such as "Popsicle", "Milk-Nickel", "Frozen Jumbo" and the like, consisting of coated ice cream and/or flavored liquids which have a handle protruding therefrom to permit their easy handling. In the fabrication of these frozen confections, a body-element serves as the "back-bone" or reinforcing core about which the materials are frozen or disposed. In this manner the structural weaknesses inherent in the material itself are decreased and a hand engaging handle is provided.

Heretofore, the body-element which formed the core and handle for the frozen confection was made as a continuous one-piece element whose major portion was disposed within the confection itself leaving a very small portion as a handle. This construction has many disadvantages. The salient disadvantage resides in the fact that as the frozen confection is eaten, the core of the body-element interferes with the eating of the confection unless the same is eaten sidewise; and even if this procedure is followed, much discomfort is caused to the individual.

In order to overcome this disadvantage in serving of frozen confections, the present article was invented by me wherein that portion of the body-element which forms the core about which the frozen confection is disposed is capable of being severed or disjoined section by section as the confection is being consumed. This construction eliminates the inconveniences inherent in the old type core and handle.

The primary object of my invention is to provide a body-element to be used as a handle and core for frozen confections which has its greater portion divided into a plurality of sections that are adapted to be severed from the body-element with little effort.

Another object of my invention is to provide an article of manufacture made of a single piece of material divided into a plurality of sections which are adapted to be easily removed by the individual when desired.

Still another and equally important object of my invention is. the provision of a one-piece body-element acting both as a core and handle for a frozen confection wherein that portion of the body-element that consists of the core is divided into a plurality of sections that can be readily removed upon the application of slight pressure.

An additional object of my invention is to provide a one-piece body-element made of wood or other suitable material that can be manufactured in large quantities with a little amount of manual labor attached in the manufacture thereof, and with very little expense attached to the cost of manufacture and/or material.

A still further object of my invention resides in the ability of the core portion of the body-element to be shortened in length as desired without materially decreasing the utility of the body-element as a core and handle for a frozen confection.

Included in the objects of the invention are a novel article of the character described, a unique arrangement of removable sections, and a unique means for retaining the sections assembled and as an integral part of the article until they are removed.

A further object of the invention is the provision of a firm unitary article of manufacture that is adapted to retain about itself a frozen confection, but which can be reduced in length when desired.

Other objects and advantages and the nature and characteristic features of my present invention will become apparent and readily understood from the following description which is to be considered in conjunction with the accompanying drawing forming a part hereof, in which:

Figure 1 is a top, plan view of my invention indicating the position of the grooves in the core portion of the body-element relative to each other and to the handle portion of the body-element and also showing in dotted line position a frozen confection disposed about the core portion of the body-element.

Figure 2 is a side view of my invention illustrating the position of the grooves within the top and bottom surfaces of the core portion of the body-element.

Figure 3 is a side view of the invention showing the position of the grooves within one surface of the core portion of the body-element only.

Figure 4 is a side view of the invention illustrating the grooves alternately disposed within the top and bottom surfaces of the core portion of the body-element.

Figure 5 is another top, plan view of my invention illustrating the application of perforations instead of grooves and showing the position of the perforations disposed through the core portion of the body-element.

Figure 6 is a side view, partially in section, of my invention indicating the construction and the position of the perforations relative to each other in the core portion of the body-element.

Like reference characters refer to like parts throughout the several views.

The present type of core and handle is manufactured of soft wood. Soft wood is used because it is cheap; it is easy to fabricate into the desired shape; it is light in weight; it is easy to maintain in a sanitary condition, and it is capable of being permeated with the substance into which it is inserted. I therefore, show a body-element 1 preferably made of soft wood although other substances having the same qualities as soft wood might be used.

While the body-element 1 is shown in the drawing as having flat surfaces, my invention contemplates the use of a body-element of any shape; round, flat or otherwise.

The body-element 1 shown in Figure 1 is illustrated in position relative to a confection 2 shown in dotted line position. The type or form of confection herein shown is not to be taken as a limitation since my invention may be used with any type of a confection.

That portion of the body-element which is enclosed within the confection is generally known as a core and is herein indicated at 3, and that portion of the body-element which extends outwardly from the confection is generally known as a handle and is shown at 4. The core 3 of the body-element is divided into sections 5, 6 and 7 by a plurality of grooves, crimps, furrows or corrugations 8, 9, 10, 11, 12 and 13 which are disposed transversely within each surface of the core 3 as shown in Figure 2. The core may be divided into sections 5, 6 and 7 by having grooves 8, 9 and 10 disposed within one surface of the core as shown in Figure 3. Or the core 3 might be divided into sections 5, 6 and 7 by having grooves 8, 10 and 12 alternately disposed therein.

It may be advantageous to use perforations instead of grooves and, therefore, I have shown in Figure 5 the core 3 divided into sections 5, 6 and 7 by perforations 14, 15 and 16 which are transversely disposed relative to the core.

Experiments have shown that when the core of the body-element is inserted in the liquid material to be frozen, the material enters into the soft wood by capilulary attraction and in this manner the soft wood is permeated with the liquid material. As crystallization of the material takes place, that portion of the material which has entered into the wood structure also crystallizes and expands sufficiently to cause the core and frozen substance to adhere to each other and form a unitary product.

The use of a soft substance, such as soft wood, is advantageous in another respect. When the frozen substance is gradually removed from the core, the substance which permeated the wood becomes decrystallized and changes from a solid to a liquid by "sweating". This has a tendency to soften the fibers in the wood and consequently makes it easier to sever the sections of the core which have been exposed to the heat of the air and/or the mouth of the consumer after the frozen substance is removed.

From the above it will be obvious that my particular arrangement of removable sections is an important one as it allows the consumer of the frozen confection to more readily enjoy the same.

It will thus be seen that there has been described an article of manufacture embodying the principles and attaining the objects of the present invention. Since various matters of construction, arrangement and detail may be modified without departing from the principles, it is not intended to limit the invention to such matters except so far as set forth in the appended claims.

Having thus described my invention, what I claim as new and useful and upon which I desire to secure Letters Patent is:

1. A new article of manufacture to be used with a product of the class described, comprising a one-piece body-element forming a handle and a core for said product, the core portion being divided into a plurality of removable sections by perforation crimps disposed transversely within the body-element and in spaced relationship with each other.

2. In a frozen confectionery product formed of an edible substance which is fluid at normal temperatures and congeals by refrigeration, means adapted to facilitate handling and consuming said product comprising a body element partially embedded in the product and attached thereto by congelation, said embedded portion being divided into a plurality of removable sections, and the projecting end of the body element forming a handle.

3. In a frozen confectionery product formed of an edible substance which is fluid at normal temperatures and congeals by refrigeration, means adapted to facilitate handling and consuming said product comprising a body element partially embedded in the product and attached thereto by congelation, said embedded portion being divided into a plurality of removable sections by a series of scores transversely disposed within the body element, and the projecting end of the body element forming a handle by means of which the frozen edible substance can be held while being consumed.

IRVING E. JACOBSON.